US010263777B2

(12) United States Patent
Shields et al.

(10) Patent No.: US 10,263,777 B2
(45) Date of Patent: Apr. 16, 2019

(54) SYSTEMS AND METHODS FOR SECURE COMMUNICATIONS USING ORGANICALLY DERIVED SYNCHRONIZED ENCRYPTION PROCESSES

(71) Applicant: Olympus Sky Technologies, S.A., Lodz (PL)

(72) Inventors: Jon Barton Shields, Escondido, CA (US); David Gell, San Diego, CA (US)

(73) Assignee: OLYMPUS SKY TECHNOLOGIES, S.A., Lodz (PL)

( * ) Notice: Subject to any disclaimer, the term of this patent is extended or adjusted under 35 U.S.C. 154(b) by 196 days.

(21) Appl. No.: 15/268,362

(22) Filed: Sep. 16, 2016

(65) Prior Publication Data
US 2017/0085378 A1 Mar. 23, 2017

Related U.S. Application Data

(60) Provisional application No. 62/329,762, filed on Apr. 29, 2016, provisional application No. 62/220,448, filed on Sep. 18, 2015.

(51) Int. Cl.
H04L 29/00 (2006.01)
H04L 9/12 (2006.01)
(Continued)

(52) U.S. Cl.
CPC ............. H04L 9/12 (2013.01); H04L 9/083 (2013.01); H04L 9/0869 (2013.01);
(Continued)

(58) Field of Classification Search
CPC ....... H04L 9/12; H04L 9/3221; H04L 9/3247; H04L 9/0869; H04L 63/0428;
(Continued)

(56) References Cited

U.S. PATENT DOCUMENTS 6,065,117 A * 5/2000 White ................. G06Q 20/367
380/255
8,582,777 B2 11/2013 Urivskiy et al.
(Continued)

OTHER PUBLICATIONS

International Search Report and Written Opinion for PCT/US2016/052326, dated Dec. 21, 2016, in 12 pages.

Primary Examiner — Don G Zhao
(74) Attorney, Agent, or Firm — Procopio, Cory, Hargreaves & Savitch LLP

(57) ABSTRACT

Organically Derived Synchronized Processes provide encryption parameter management in a certificate-less system. A first node generates a parameter data set containing multiple values; uses a seed value stored at the first node to select values from a random parameter data set to form a parameter subset; generates encryption parameters using the subset; encrypts user data using the encryption parameters; generates a signature based at least on the parameter data set; and transmits a start frame including the parameter data set, the encrypted user data, and the signature. A second node receives the start frame; uses a seed value stored at the second node to select values from the received parameter data set to form a parameter subset; generates decryption parameters using the subset; decrypts the user data using the decryption parameters; and verifies the received signature. The encryption and decryption parameters are then applied to further payload data.

18 Claims, 4 Drawing Sheets

(51) Int. Cl.
  *H04L 9/32* (2006.01)
  *H04L 9/08* (2006.01)
  *H04L 29/06* (2006.01)

(52) U.S. Cl.
  CPC ........ *H04L 9/3247* (2013.01); *H04L 63/0428* (2013.01); *H04L 63/123* (2013.01); *H04L 63/0435* (2013.01)

(58) Field of Classification Search
  CPC ............... H04L 63/0435; H04L 63/123; H04L 2209/24; H04L 9/083
  See application file for complete search history.

(56) References Cited

U.S. PATENT DOCUMENTS

| | | | |
|---|---|---|---|
| 8,601,274 B2 * | 12/2013 | Nagura | H04L 9/3247 173/180 |
| 8,874,926 B1 * | 10/2014 | Edwards | G06F 21/75 713/180 |
| 8,885,820 B1 | 11/2014 | Lambert et al. | |
| 9,935,774 B2 * | 4/2018 | Sharma | H04L 9/3242 |
| 2003/0235308 A1 * | 12/2003 | Boynton | H04W 76/10 380/270 |
| 2006/0088060 A1 * | 4/2006 | Fujikami | H04L 1/0041 370/474 |
| 2006/0093135 A1 * | 5/2006 | Fiatal | H04L 63/0428 380/28 |
| 2008/0240443 A1 * | 10/2008 | Vuillaume | H04L 9/3247 380/277 |
| 2010/0082988 A1 | 4/2010 | Huebner et al. | |
| 2011/0093717 A1 | 4/2011 | Iwao et al. | |
| 2011/0261890 A1 * | 10/2011 | Nagura | H04L 9/3247 375/259 |
| 2012/0008787 A1 | 1/2012 | Wan et al. | |
| 2015/0052364 A1 * | 2/2015 | Edwards | G06F 21/75 713/180 |

* cited by examiner ized Encryption Processes

SYSTEMS AND METHODS FOR SECURE COMMUNICATIONS USING ORGANICALLY DERIVED SYNCHRONIZED ENCRYPTION PROCESSES

CROSS-REFERENCE TO RELATED APPLICATIONS

This application claims the benefit of U.S. provisional application Ser. No. 62/220,448, filed Sep. 18, 2015 and U.S. provisional application Ser. No. 62/329,762, filed Apr. 29, 2016, all of which are hereby incorporated by reference.

BACKGROUND

The internet of things (IoT) which includes machine-to-machine communications is a rapidly growing market. The IoT is expect to provide many benefits in a wide range of systems and applications such as automobiles, vending machines, alarm systems, remote sensors, tracking devices for shipping containers, remote monitoring in health applications, and monitoring of industrial equipment. Such systems are highly complex. For example, a modern vehicle may contain over one hundred electronic control units (ECUs) supporting comfort, convenience, and mission critical functions. Connected vehicles additionally contain one or more external communication systems (e.g., wireless gateways).

Communications between devices should be secure to prevent interception of data or insertion of data from an unauthorized entity. Security failures have already occurred an are likely to increase if previous systems are not improved. Secure communications are resistant to interception of the communications by unauthorized entities and resistant to injection of communications from unauthorized entities.

Prior IoT systems have used, for example, certificate-based communication security, such as public key infrastructure (PKI). PKI is a poor choice for IoT. Characteristics of PKI include certificate management, asymmetrical key exchange and processing, common certificates, third party dependencies, and static seeds. These characteristics lead to high deployment cost & complexity, long link establishment/latency, increased processing power & power consumption, and decreased security for multi-node networks.

Accordingly, a better way to secure IoT and other communications is needed.

SUMMARY

In one aspect, a method for secure communication is provided. The method includes: generating, at a first node, a parameter data set containing a plurality of values; selecting, using a first seed value stored at the first node, one or more of the plurality of values in the parameter data set to form a first parameter subset; generating, at the first node, using the first parameter subset, a first cipher key; encrypting, at the first node, user data using a first ciphersuite and the first cipher key; generating a first signature based at least on the parameter data set; transmitting, from the first node to a second node, a start frame including the parameter data set, the encrypted user data, and the first signature at a first signature location in the start frame; receiving, at the second node, the start frame; selecting, using a second seed value stored at the second node, one or more of the plurality of values in the parameter data set in the received start frame to form a second parameter subset; generating, using the second parameter subset, a second cipher key; decrypting the user data using a second ciphersuite and the second cipher key; and verifying a signature at a second signature location in the received start frame.

In another aspect, a system with secure communication is provided. The system includes: a first node storing first seed value and configured to generate a parameter data set containing a plurality of values, select, using the first seed value, one or more of the plurality of values in the parameter data set to form a first parameter subset, generate, using the first parameter subset, a first cipher key, encrypt user data using a first ciphersuite and the first cipher key, generate a first signature based at least on the parameter data set, transmit a start frame including the parameter data set, the encrypted user data, and the first signature at a first signature location in the start frame; and a second node storing second seed value and configured to receive the start frame, select, using the second seed value, one or more of the plurality of values in the parameter data set in the received start frame to form a second parameter subset, generate, using the second parameter subset, a second cipher key, decrypt the user data using a second ciphersuite and the second cipher key, and verify a signature at a second signature location in the received start frame.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Organically Derived Synchronized Processes (ODSP) are used for encryption parameter management in presently disclosed systems and methods. ODSP is a certificate-less, zero knowledge authentication based system. ODSP may be used, for example, in systems where communication is between devices that are "known" to each other. ODSP may be implemented, for example, as a software library that integrates into IoT nodes, gateways, backend servers, remote devices, or other communication endpoints where secure communication is desired. Other implementations may use special purpose hardware or a combination of software and hardware. ODSP services can manage key administration, including attack detection and reporting.

Advantageous features of ODSP include low complexity. For example, ODSP systems are certificate-less with no public key exchange or processing. This can accelerate link setup, reduce power consumption and processing overhead, and eliminate certificate administration. Another feature of ODSP is that it is secure and robust, for example, using per session seed and key rotation and robust synchronization and resynchronization. This can allow improved security and detection of compromised communication. ODSP can be used with existing cryptography techniques thereby leveraging certified and standards compliant hardware and software libraries. This can facilitate quick system deployment.

Figure 1:
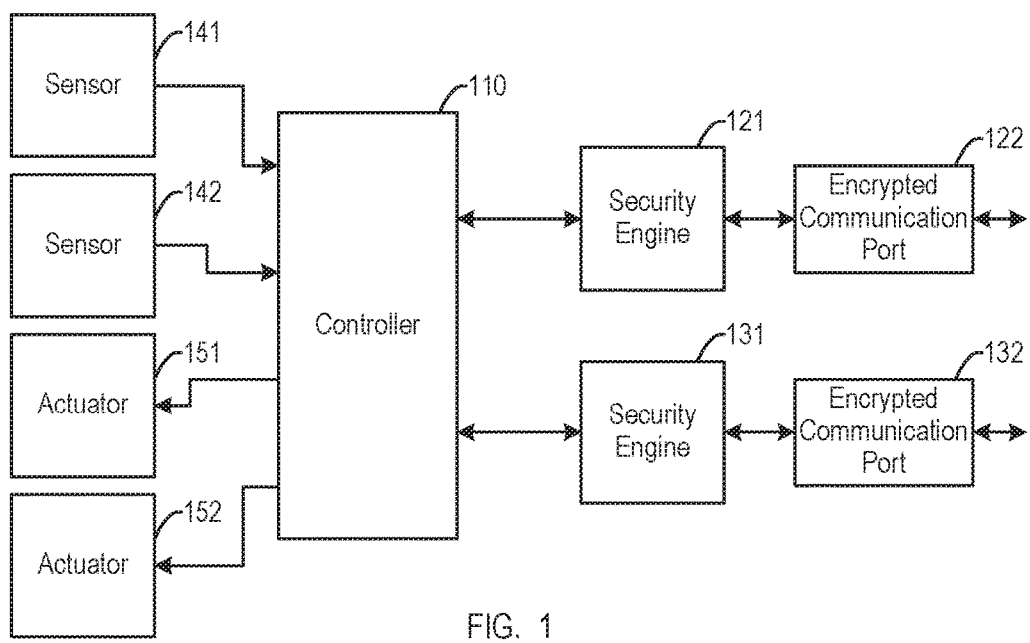
FIG. 1 is a block diagram of a communication node.

FIG. 1 is a block diagram of a communication node. The node includes a controller 110. The controller 110 may include a processor and memory. The controller 110 provides functions according to the particular functions of the node. If the node is an automotive engine control module, the controller 110 may, for example, control ignition timing and fuel injection.

The controller 110 receives information from a first sensor 141 and a second sensor 142. The sensors may provide environmental information, for example, temperature to the controller 110. The controller 110 provides commands to a first actuator 151 and a second actuator 152. The actuators may, for example, move mechanical components. The numbers and types of sensors and actuators may vary with the function of the node.

The controller 110 may communicate with another node via a first encrypted communication port 122 with the communication secured by a first security engine 121. The controller 110 may also communicate with still another node via a second encrypted communications port 132 with the communication secured by a second security engine 131. The encrypted communication ports may provide communications in various manners. For example, in an automotive application, one port may use the controller area network standard (CAN) for communication within the vehicle and another port may use a wireless standard for communication outside the vehicle. The security engines may protect the communications using organically derived synchronized processes.

The components of the node of FIG. 1 may share some hardware. For example, the controller 110, the first security engine 121, and the second security engine 131 may use a common processor. Additionally, the communication node may referred to as an endpoint.

Figure 2:
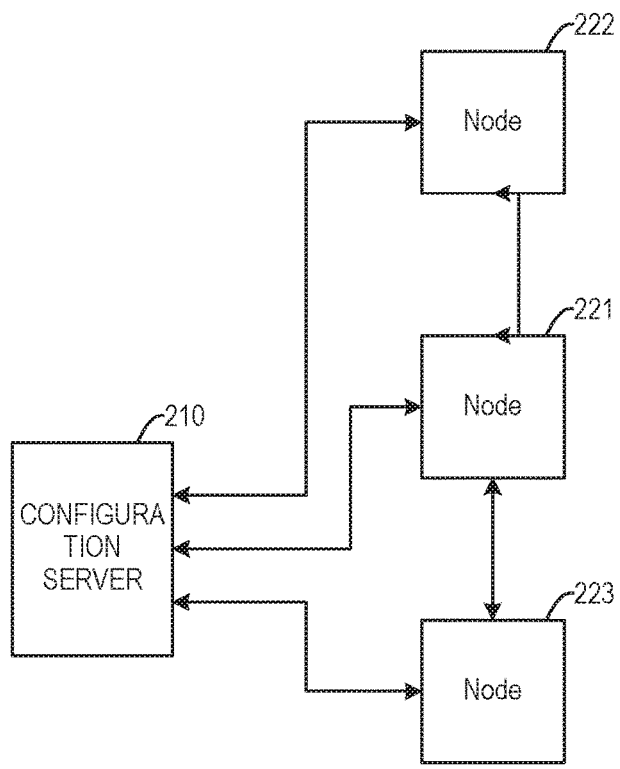
FIG. 2 is a block diagram of a communication system with zero-knowledge based authentication.

FIG. 2 is a block diagram of a communication system with zero-knowledge based authentication. The system includes a first node 221, a second node 222, and a third node 223. Each of the nodes may be the node of FIG. 1. The first node 221 communicates with the second node 222 via a first point-to-point communication link and with the third node 223 via a second point-to-point communication link. In other systems, the nodes may use different communications links, for example, they may be connected in a mesh.

The system also includes a configuration server 210. The configuration server 210 may be one server or a combination of servers including hierarchically arranged servers and proxies. The configuration server 210 may communicate with the nodes via dedicated communication ports. The configuration server 210 may supply configuration information to the nodes. For example, the configuration server 210 may provision the nodes with initial seed values used to encrypt communications between the nodes. Provisioning can be performed locally or remotely. The provisioning prepares the nodes for secure communication. The configuration server 210 may also be used to resynchronize seed values, for example, in the event of a loss of synchronization, to monitor link status, and key revocation. Resynchronization of values may occur periodically or be event driven. Some servers may have designated uses, such as, a master factory configuration server, a factory (non-master) configuration server, a field factory configuration server, and a field (non-master) configuration server.

Figure 3:
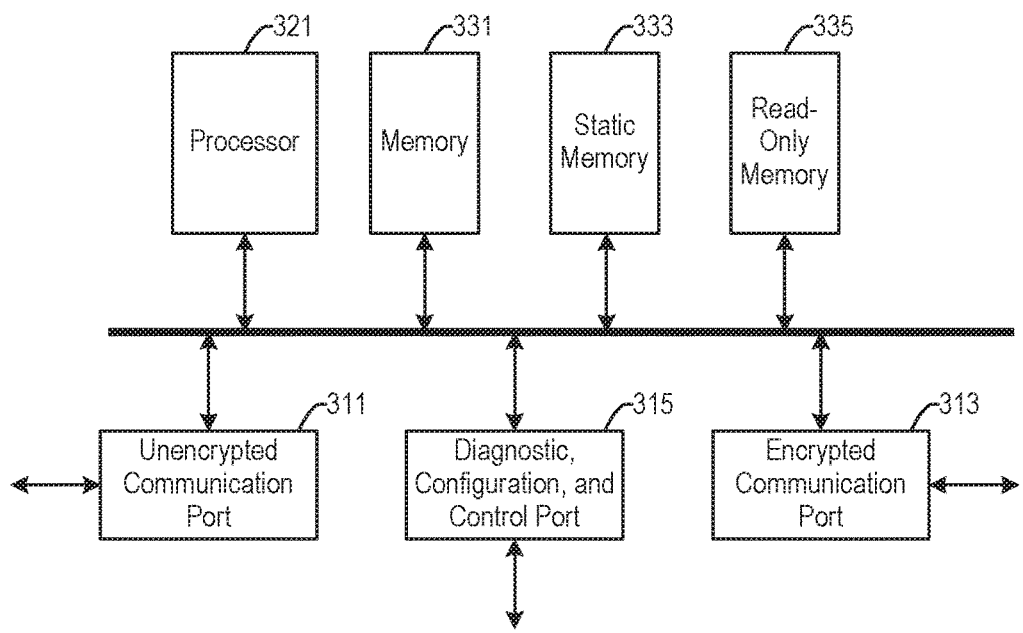
FIG. 3 is a block diagram of security engine.

FIG. 3 is a block diagram of security engine. The security engine of FIG. 3 may implement the first security engine 121 and the second security engine 131 of the communication node of FIG. 1. Although the security engine of FIG. 3 may be used in many different systems, to provide a specific example, aspects of the security engine of FIG. 3 will be described with reference to the first security engine 121 of the node of FIG. 1.

The security engine includes an unencrypted communication port 311 and an encrypted communication port 313. The unencrypted communication port 311 carries unprotected communications. The unencrypted communication port 311 may, for example, connect the first security engine 121 to the controller 110. The encrypted communication port 313 carries protected communications. The encrypted communication port 313 can connect the security engine to another security engine.

The security engine also includes a diagnostic, configuration, and control port 315. The diagnostic, configuration, and control port 315 can provide communications with a configuration server.

A processor 321 provides processing for the security engine. The processing includes, for example, encryption of communications from the unencrypted communication port 311 to the encrypted communication port 313, decryption of communications from the encrypted communication port 313 to unencrypted communication port 311, and management of the security processing. The processor is coupled to the unencrypted communication port 311, the encrypted communication port 313, and the diagnostic, configuration, and control port 315 as a sink and source of the corresponding communications.

The security engine of FIG. 3 includes three storage modules coupled to the processor 321. A memory 331 can provide working memory storing, for example, input data, output data, and intermediate data. The memory 331 may be random-access memory. A read-only memory 335 can provide permanent storage of values that do not change during operation of the security engine. For example, the read-only memory 335 may store program instructions. A static memory 333 can store information that are static in the sense of being saved when the security engine is powered off but which can change during operation of the security engine. For example, the security engine may store parameters that the security engine uses to encrypt communications. The static memory 333 may be implemented, for example, with FLASH memory. Although FIG. 3 illustrates there separate storage modules, other embodiments may use different types and combinations of storage.

Some features of the security engine may be stored in tamperproof hardware module. The module may contain, for example, seed values and other configuration information. In an embodiment, the tamperproof hardware module can only be accessed via a security engine's diagnostic, configuration, and control port.

Figure 4:
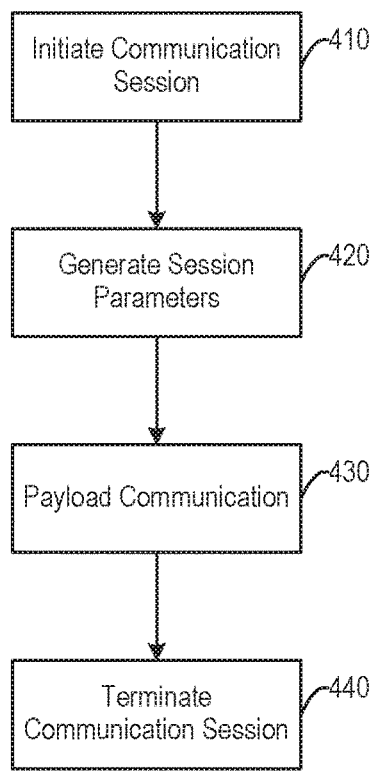
FIG. 4 is a flowchart of a process for secure communications.

FIG. 4 is a flowchart of a process for secure communications. To provide a specific example, aspects of the process will be described with reference to the communication node of FIG. 1, the communication system of FIG. 2, and the security engine of FIG. 3; however, the process may be used with any suitable apparatus.

In block 410, the process initiates a secure communication session. For example, the first node 221 may initiate the session by sending a start frame to the second node 222. Initiation of a session (and other management and maintenance functions) may use a guaranteed delivery protocol such as a connection oriented protocol, for example, transmission control protocol (TCP). A nodes the initiates a session may be considered the managing node for that session. The start frame may be encrypted, for example, using initial parameters or parameters from a prior session. The start may also be referred to as a session establishment frame.

In block 420, the process generates parameters used to secure the communications for the secure communication session. For example, the first node 221 may combine a seed value stored at the first node with random data to produce some contents of the start frame and generate the parameters used to secure the communications from the seed value and the random data. The random data forms a parameter data set. The size of the parameter data set may be dynamic. The second node 222 may generate parameters it uses to secure the communications from a seed value stored at the second node and data from the start frame. During normal operation, the seed value stored at the first node and the seed value stored at the second node are equal and the generated parameter will match. The parameters may be generated using a multifactored approach and can be used for symmetric key encryption. Other management frames may be similarly encrypted.

In block 430, the process communicates encrypted payload data. For example, the first node 221 may send payload frames to the second node 222, and the second node 222 may send payload frames to the first node 221. The payload data is protected using the parameters generated in block 420. The encrypted payload data may be communicated using a low-overhead protocol, for example, user datagram protocol (UDP). The payload data is information that the nodes communicate to perform their system functions. The start frame may also include encrypted payload data. The payload data may also be referred to as user data.

In block 440, the process terminates the secure communication session initiated in block 410. For example, if the transmission control protocol (TCP) was used to send the start frame initiating the secure communication session, terminating the TCP session can be used to terminate the secure communication session. The session may be terminated explicitly or implicitly, for example, by a session timeout. A session may also terminate due to unsuccessful communication.

The process of FIG. 4 may be modified by adding, omitting, or altering steps. Some steps of the process may be reordered or executed concurrently.

Figure 5:
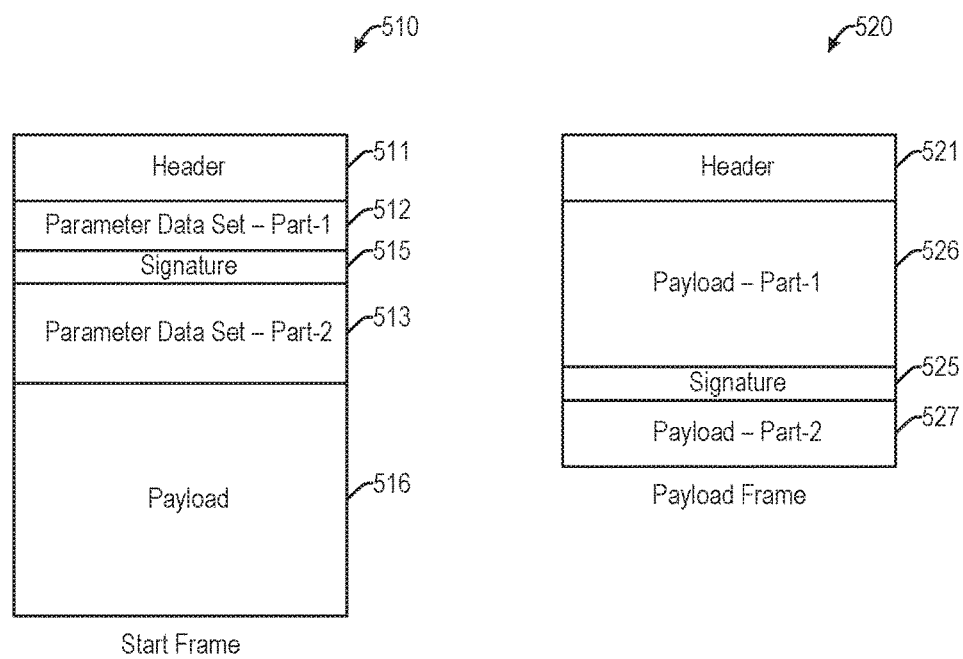
FIG. 5 is diagram of frame formats.

FIG. 5 is diagram of example frame formats. The frame formats may be used with the process for secure communications of FIG. 4. A start frame format 510 can be used to send the start frame of block 410. The start frame format 510 includes a header 511. The header 511 may include information identifying the frame as a start frame, identifying the source and destination of the frame, and the length of the frame.

The start frame format 510 includes a parameter data set (block 420) that may be split into a first part 512 and a second part 513 that are located at two locations in the frame. A signature 515 is located between the first part 512 and the second part 513 of the parameter data set. The signature 515 may be a cyclic redundancy check of the parameter data set. Alternatively, the signature 515 may be a cyclic redundancy check that covers, additionally or alternatively, other contents of the start frame. The locations of signatures may also be referred to as signature offsets. The signature may be, for example, thirty-two bits.

The start frame format 510 may also include payload data 516, which is protected using parameters derived from the parameter data set. The signature 515 may alternatively be located in or adjacent to the payload data 535. Both the contents and the location of the signature increase security of the frame. Verification of the signature by a receiving security engine may be viewed as zero knowledge authentication.

A payload frame format 520 can be used to send the payload data of block 430. The payload frame format 520 includes a header 521. The header 521 of the payload frame format 520 may be similar to the header 511 of the start frame format 510.

The payload frame format 520 includes payload data, which is protected using parameters derived from the parameter data set of a preceding start frame. The payload data may be split into a first part 526 and a second part 527 that are located at two locations in the frame. A signature 525 is located between the first part 526 and the second part 527 of the payload data. The signature 525 may be a cyclic redundancy check of the payload data.

Figure 6:
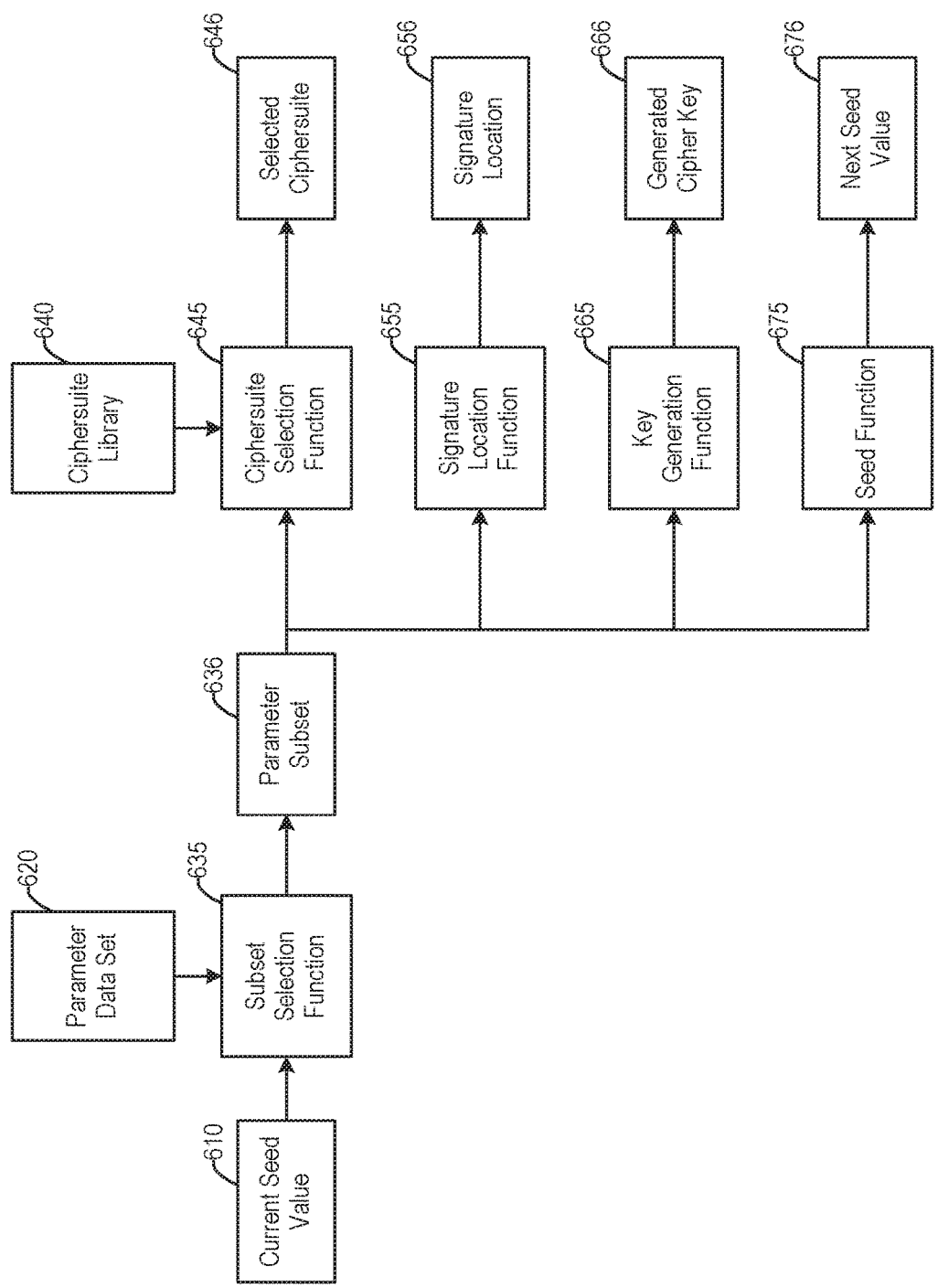
FIG. 6 is a flowchart of a process for generating parameters used for secure communications.

FIG. 6 is a flowchart of a process for generating parameters used for secure communications. The process may be used to generate the parameters (block 420 of the process of FIG. 4) used to secure communications. The process is performed at the nodes that engage in secure communication sessions.

The process uses a current seed value 610. The current seed value 610 may, for example, be a value from an initial configuration of the security engine or a next seed value 676 from a prior performance of the process. The current seed value 610 may, for example, 32 bits. The process also uses a parameter data set 620. The parameter data set 620 may, for example, be random values generated by a security engine that initiates a communication session or a values received in a start frame. Random values may be generated, for example, using a hardware true random number generator, physically unclonable device, or derived from a sensor measurement. The source of the random values should be immune from tampering.

The process uses the current seed value 610 and the parameter data set 620 to generate a selected ciphersuite 646, a signature location 656, and a generated cipher key 666 as parameters for secure communications. The process also generates the next seed value 676 for use as the current seed value 610 in a subsequent performance of the process. The current seed value 610 may be updated at the end of a communication session.

The parameter data set 620 may be referred to as a synchronized data sets denoting that synchronized values are stored in multiple nodes. Parameter data sets may common to two security engines at the ends of a point-to-point link or common to a larger group of security engines. A synchronized data set may include all or any of the information (including the parameters or values used to generate the parameters) used to communicate data or for link management. A node may maintain a table of data sets, for example, a data set for each link associated with the node. A node may also maintain one or more data sets for provisioning, for example, a data set for factory provisioning and a data set for field provisioning.

The process uses a subset selection function 635 to select one or more values from the parameter data set 620 to form a parameter subset 636. The parameter subset 636 is then used to generate other parameters. Selecting the parameter subset may include multiple substeps. For example, the process may first determine a number of parameters to include in the parameter subset, determine a selection function to be used to select the parameters, and use the selected function to select the determined number of parameters. The parameter subset 636 may also be referred to as a parameter data set sub set or PDS sub set.

A ciphersuite selection function 645 is used to determine the selected ciphersuite 646 based on the parameter subset 636. The selected ciphersuite 646 may be one or a combination of cipher functions selected from a ciphersuite library 640. The selected ciphersuite 646 may be used to encrypt payload data.

A signature location function 655 is used to determine the signature location 656 based on the parameter subset 636. The signature location 656 may determine locations of the signatures in start frames and payload frames. The signature location 656 may include a value for start frames and a separate value for payload frames.

A key generation function 665 is used to generate the generated cipher key 666 based on the parameter subset 636. The generated cipher key 666 may be used with the selected ciphersuite 646 to encrypt payload data.

A seed function 675 is used to generate the next seed value 676 based on the parameter subset 636.

Similar to the subset selection function 635, the ciphersuite selection function 645, the signature location function 655, the signature location function 655, and the seed function 675 may include multiple substeps. Additionally, some functions may use all or parts of the parameter subset 636 directly as their results. Example functions include hash functions.

The process of FIG. 6 may be modified by adding, omitting, or altering steps. For example, in an implementation that uses a fixed ciphersuite, the ciphersuite selection function 645 may be omitted. Some steps of the process may be reordered or executed concurrently. Additionally, some functions may depend on the results of other functions. For example, the key generation function 665 may operate differently depending on the selected ciphersuite 646.

Multiple commands may be used to configure and manage secure nodes and their security engines and the nodes operate in various states, both during configuration and during functional operation. Some configuration states may only be used when a configuration server communicates with another node via a diagnostic, configuration, and control port.

A node may operate in an offline state or an online state with corresponding commands used to switch the node into those states. Similarly, individual links (e.g., in a node with multiple security engines) may be switch to online or offline states with corresponding commands. The online and offline commands may communicated between nodes on a link. The offline state may be the default state into which a node begins operation.

A port manual reset command can be used to place a node into an offline state (if it was not already offline) and then reprogram the node with parameter values that may be specified within the command.

A create security link association command can be used to add associations (also referred to as security link group) a between two or more nodes. A create security link command can be used to a node to a security link group. Similarly, a delete security link command can used to remove a node from a security link group. When a final node (or penultimate node) is remove for a security link group, the group itself may also be removed.

A security link reset command can reset a node over a secure link. A test security link command can be used to diagnose a link. The command may initiate one or a sequence of tests to check and validate the status and integrity of a security link or security link group.

Although the above commands are described as being issued by a configuration server, similar commands may be issued node-to-node. Such commands can be triggered by first node receiving a command from a configuration server.

Link reset commands are used when reset of an existing security link is desired. Examples of when reset may be desired include: when the link encountered an unrecoverable synchronization issue (this condition should be exceptionally rare); when a node that is part of an existing security link is being replaced (such a reset may be done manually or via a semi-autonomous method); and based on a system management decision to reset, for example, based upon an issue or a concern (e.g., detection of a security leak). Such a reset may be periodic.

Nodes may need resynchronization since the security engines rely on synchronization of parameters (e.g., seed values and parameter data sets). A system may use one or more resynchronization method in the event that synchronization is lost. Resynchronization may be immediate and event driven, for example, following a loss of synchronization detection. Resynchronization may also be a timeout based re-sync, for example, in the event that an immediate re-sync fails and a time threshold (e.g., 30 seconds) has been exceeded since a last successful communication. Additionally, a semi-permanent disabled mode may be employed if resynchronization fails. A semi-permanent disabled mode may be recovered via a configuration server.

Resynchronization may include multiple management frames communicated between nodes. A fallback resynchronization start frame is a first step in a three-way handshake for reestablishing synchronization of a security link. The fallback resynchronization start frame may be transmitted in response to an incoming frame when receiving security engine cannot decrypt the incoming frame using its decryption parameters. The decryption parameters may be parameters used for start frames and payload frames, parameters used for management frames, or parameters specific to resynchronization frames. The fallback resynchronization start frame is send from the node that was unable to decrypt an incoming frame to the node that transmitted that frame.

A fallback resynchronization response frame is a second step in the three-way handshake for reestablishing synchronization. The fallback resynchronization response frame is transmitted in response to a fallback resynchronization start frame.

A fallback resynchronization complete frame is a third step in the three-way handshake for reestablishing synchronization. The fallback resynchronization complete frame is transmitted in response to a fallback resynchronization response frame.

The frame format for each of the above resynchronization frame may be based on session seed values, for example, determined using a hash function.

A failsafe resynchronization process may be use dedicated parameters (e.g., ciphersuite and cipher key) to resynchronize a link. This process may be used, for example, when a session has not occurred on a link with a failsafe time period. Then, when an attempt is next made to start establish a secure communication session, the nodes in the of the security link group will utilize the dedicated parameters to communicate.

The above descriptions describe details of systems where nodes are provisioned or programmed by a configuration server (also referred to as diagnostic configuration device) via a connection to each node. The provisioned parameter data sets allow the securing of communication paths between two communication nodes. The parameter data sets were provisioned on each node prior to its operation of secure communication.

The diagnostic configuration device may be a physical device that is directly connected to a node via a wired or wireless network connection. A diagnostic configuration device may also be indirectly connected to a node via a network such as an Ethernet network, a Wi-Fi network, or a network comprising multiple communication technologies.

The provisioning of a node across an indirect connection may require the traversal of data across a network of one or more intermediate networking nodes such as switches, routers, gateways or firewalls, thus allowing the connection to take place at an arbitrary distance. An indirect connection may include the traversal of data across both private and public networks.

A diagnostic configuration device may be a logical entity that is part of a larger physical entity. For example, a diagnostic configuration device may be an application executing on a server or computer that may host one or more functions in addition to diagnostic configuration device related functions. The diagnostic configuration device logical entity may operate within a virtual machine or container. A diagnostic configuration device as a logical entity may be connected to a communication node either directly or indirectly, as described above.

In each of the above diagnostic configuration device connection scenarios, the communication between the diagnostic configuration device and the network node should be secured.

In some scenarios, the diagnostic configuration device and communication nodes to be provisioned may be located in a physically secure environment (e.g., a network in an access-controlled factory environment). In such a case, the connection between diagnostic configuration device and communication node may not need itself to be logically secured. The physical security of the communication between diagnostic configuration device and communication node may provide sufficient security.

However, there are other scenarios in which it is desired that the connection between the diagnostic configuration device and each communication node may itself be secured during provisioning. Accordingly, the diagnostic configuration device connection may use a public key infrastructure (PKI) technique to secure the diagnostic configuration device connection. In such a scenario, a security certificate, signed by a certificate authority may be used to communicate a public key from the diagnostic configuration device to the communication node. The certificate may be validated by the communication node in order to authenticate the diagnostic configuration device. The diagnostic configuration device public key may then be used by the communication node to send information back to the diagnostic configuration device in order to establish a two-way, symmetrically encrypted communication between the diagnostic configuration device and communication node, for the purposes of provisioning. This PKI security technique may be used only once, to perform initial provisioning of the node, after which ODSP security is used to communicate securely between communicate nodes, or between communication nodes and a diagnostic configuration device. Alternatively, PKI may be used as a fallback technique to resynchronize nodes. For example, if two nodes are unable to resynchronize (and thus establish secure communication) using the synchronization methods described above, a PKI session may be established between each communication node and a diagnostic configuration device to re-initialize one or more parameters.

There are many variants of PKI systems that may be used or configured to establish a secure communication link for use in the scenarios described above. This may include options for authenticating certificates, using differing key lengths, and using different ciphersuites. Security protocols besides PKI may also be used for the securing of a diagnostic configuration device connection and for fallback purposes.

Having described systems and methods for secure communications, further aspects of example implementations are now described to aid in further understanding these systems and methods.

A first example system may applied to home and building automation. Example requirements for and characteristics of such a system follow. The size of the parameter data set (PDS) may be between 64 and 512 bytes. The signature (CRC) is four bytes. The signature is a cyclic redundancy check of the entire frame payload, including the signature itself. The signature for a start frame is located with the parameter data set. The locations of the signature are regenerated every session. The signature locations are different between the start frame and the payload frames. The payload data (BEP) is up to 16,384 (16 k) bytes.

The following example illustrates different calculations for two sessions, AB and AB'. AB represents the first session's signature (proof value) offset function seed value. AB' represents the second session's signature (proof value) offset function seed value. Thus, using the below functions:

$f_{SEF}(AB, \mathcal{X}1)$ computes the signature offset within the current session's start frame, for a given length, $\mathcal{X}1$, of the encrypted (non-header) portion of the start frame (where $\mathcal{X}1$=sizeof(PDS)+sizeof(CRC)+sizeof(BEP)); and $f_{BEP}(AB, \mathcal{X}2)$ computes the signature offset within the payload portion of a payload frame within the current session, with a given length, $\mathcal{X}2$, of the payload.

and $f_{SEF}(AB', \mathcal{X}3)$ computes the signature offset within the current session's start frame, for a given length, $\mathcal{X}3$, of the encrypted (non-header) portion of the start frame (where $\mathcal{X}3$=sizeof(PDS)+sizeof(CRC)+sizeof(BEP)).

And, $f_{BEP}(AB', \mathcal{X}4)$ computes the signature offset within the payload portion of a payload frame within the current session, with a given length, $\mathcal{X}4$, of the payload.

Each node within the security link group uses synchronized seed values to generate a hash value. The below set of equations provides an overview of this process:

Let $AB_{CSSV}$ represent the current session starting seed value (also referred to as the current seed value).

Let $AB_{PDSSubsetSize}$ represent the next session PDS subset size.

Then:

$AB_{PDSSubsetSize} = f_{PDSSubsetSize}(AB_{CSSV})$ calculates the PDS subset size.

The current session seed value and the PDS subset size derived above can be used to select the parameter subset from the parameter data set. The below equations demonstrate this relationship:

Let PDS represent the parameter data set.

Let $AB_{CSSV}$ represent the current session starting seed value.

Let $AB_{PDSSubsetSize}$ represent the PDS subset size.

Let $AB_{PDSSubset}$ represent the PDS subset.

Then:
$AB_{PDSSubset} = f_{PDSSubset}(PDS, AB_{CSSV}, AB_{PDSSubsetSize})$ selects the PDS subset.

The selected parameters derived as described above may be used for deriving decisions and generating values such as keys, updated seeds, and other related values. The selected parameters may be used for multiple derived decisions and generation of multiple values. New hash values and parameter subsets may be derived for each individual derived decision or value created. Thus, the actions described may be repeated for each individual derived decision and value created.

The system may use AES128 as a default ciphersuite and may use cipher block chaining.

The next session's cipher key may be computed using the parameter subset selected as described above. The below equations illustrate this relationship:

Let $AB_{PDSSubset}$ represent the PDS subset.
Let $AB_{CipherKey}$ represent the next session's cipher key.

Then:
$AB_{CipherKey} = f_{CipherKey}(AB_{PDSSubset})$ creates the next session's cipher key.

The next session's starting seed value may be computed using the parameter subset selected as described above. The below equations illustrate this relationship:

Let $AB_{PDSSubset}$ represent the PDS subset.
Let $AB_{StartingSeed}$ represent the next session's starting seed value.

Then:
$AB_{StartingSeed} = f_{StartingSeed}(AB_{PDSSubset})$ creates the next session's starting seed value.

The starting seed value is the core value used during the subsequent session to determine the number of elements to be used for the PDS subset, which values within the PDS subset to be used, and, the order of the PDS subset values.

The next session's signature offset function seed may be computed using the PDS subset selected as described above. The below equations illustrate this relationship:

Let $AB_{PDSSubset}$ represent the PDS subset.
Let $AB_{ZKA\text{-}OffsetSeed}$ represent the next session's signature function offset seed.

Then:
$AB_{ZKA\text{-}OffsetSeed} = f_{ZKA\text{-}OffsetSeed}(AB_{PDSSubset})$ creates the next session's signature offset function seed.

The session signature proof value offset function seed is used as input to the function that calculates the relative offset within the encrypted payload of a frame.

The signature offset is calculated as a function of the signature value offset seed and the BEP length of the current frame. The below equations illustrate this relationship:

Let $BEP_{Length}$ represent the length of the BEP within the current frame.
Let $AB_{ZKA\text{-}OffsetSeed}$ represent the current session's signature function offset seed.

Then:
$ZKA_{Offset} = f_{ZKA\text{-}Offset}(AB_{ZKA\text{-}OffsetSeed}, BEP_{Length})$ calculates the Signature proof value offset for BEP within the current frame.

The system includes "keep-alive" frames transmitted that may during idle period. A keep-alive frame seed may be computed using the PDS subset selected as described above. The below equations illustrate this relationship:

Let $AB_{PDSSubset}$ represent the PDS subset.
Let $AB_{KeepAliveFrameSeed}$ represent the next session's keep-alive frame seed.

Then:
$AB_{KeepAliveFrameSeed} = f_{KeepAliveFrameSeed}(AB_{PDSSubset})$ creates the next session's keep-alive frame seed.

The session keep-alive frame seed is used as input to the function that creates a unique session specific keep-alive frame.

The length of the payload within the keep-alive frame is derived from the current session's keep-alive seed and a random value within the originating node. The below equations illustrate this relationship:

Let $AB_{KeepAliveFrameSeed}$ represent the next session's "Keep-Alive" Frame Seed.
Let $CurFrame_{RandomValue}$ represent a random value generated for calculating the keep alive frame's BEP length.
Let $BEP_{Length}$ represent the length of the BEP within the current frame.

Then:
$BEP_{Length} = f_{KA\text{-}BEP\text{-}length}(AB_{KeepAliveSeed}, CurFrame_{RandomValue})$ calculates the length of the BEP portion for the current "Keep Alive" frame.

The node receiving the keep-alive frame uses the length found within the keep-alive frame for use as the $BEP_{Length}$ when calculating whether or not the keep-alive data within the received frame is accurate.

Data content within a keep-alive frame is derived from the current session's keep-alive seed and the length of the payload within the keep-alive frame. The below equations illustrate this relationship:

Let $BEP_{Length}$ represent the length of the BEP within the current frame.
Let $AB_{KeepAliveSeed}$ represent the current session's "Keep-Alive" data seed.
Let $KeepAlive_{FrameData}$ represent the data within the current "Keep-Alive" frame.

Then:
$KeepAlive_{FrameData} = f_{FrameData}(AB_{KeepAliveSeed}, BEP_{Length})$ calculates the data within the BEP portion of the current "Keep Alive" frame.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a processor. As used herein a processor may be a general purpose processor, a digital signal processor (DSP), an application specific integrated circuit (ASIC), a field programmable gate array (FPGA) or other programmable logic device, discrete gate or transistor logic, discrete hardware components, or any portion or combination thereof that is capable of performing the functions described herein. A general purpose processor can be a microprocessor, but in the alternative, the general purpose processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described as transmitting data to (or receiving from) a second device when there are intermediary devices that couple the first and second device and also when the first device is unaware of the ultimate destination of the data.

What is claimed is:

1. A method for secure communication, the method comprising:
    generating, at a first node, a parameter data set containing a plurality of values;
    selecting, using a first seed value stored at the first node, one or more of the plurality of values in the parameter data set to form a first parameter subset;
    generating, at the first node, using the first parameter subset, a first cipher key;
    encrypting, at the first node, user data using a first ciphersuite and the first cipher key resulting in encrypted user data;
    generating a first signature based at least on the parameter data set;
    transmitting, from the first node to a second node, a start frame including the parameter data set, the encrypted user data, and the first signature at a first signature location in the start frame;
    receiving, at the second node, the start frame;
    selecting, using a second seed value stored at the second node, one or more of the plurality of values in the parameter data set in the received start frame to form a second parameter subset;
    generating, using the second parameter subset, a second cipher key;
    decrypting the encrypted user data using a second ciphersuite and the second cipher key; and
    verifying the first signature at a first signature location in the start frame;
    encrypting, at the first node, further user data using the first ciphersuite and the first cipher key as encrypted further user data;
    generating a second signature based at least on the further user data;
    transmitting, from the first node to the second node, a data frame including the encrypted further user data and the second signature at a second signature location in the data frame;
    receiving, at the second node, the data frame;
    decrypting the encrypted further user data using the second ciphersuite and the second cipher key; and
    verifying the second signature at the second signature location in the data frame.

2. The method of claim 1, wherein the parameter data set includes random values.

3. The method of claim 1, wherein the first seed value equals the second seed value.

4. The method of claim 3, wherein
    the first parameter subset equals the second parameter subset;
    the first ciphersuite equals the second ciphersuite; and
    the first cipher key equals the second cipher key.

5. The method of claim 1, further comprising:
    detecting a failure to verify the signature at the second signature location in the received data frame; and
    resynchronizing, in response to detecting the failure, the first seed value at the first node and the second seed value at the second node.

6. The method of claim 1, further comprising:
    detecting a failure to verify the signature at the first signature location in the received start frame; and
    resynchronizing, in response to detecting the failure, the first seed value at the first node and the second seed value at the second node.

7. The method of claim 1, wherein selecting the first parameter subset includes:
    determining a number of parameters in the first parameter subset; and
    selecting the number of parameters from the parameter data set to form the parameter subset.

8. The method of claim 1, wherein generating the first cipher key includes:
    selecting a cipher key generation function from a cipher key generation function library; and
    generating the first cipher key using the selected cipher key generation function.

9. The method of claim 1, further comprising:
    selecting, at the first node, using the first parameter subset, the first ciphersuite from a first ciphersuite library; and
    selecting, at the second node, using the second parameter subset, the second ciphersuite from a second ciphersuite library.

10. The method of claim 9, wherein the first ciphersuite library equals second ciphersuite library.

11. The method of claim 1, further comprising:
    generating, using the first parameter subset, the first signature location.

12. The method of claim 1, further comprising:
    generating, at the first node, a next first seed value; and
    generating, at the second node, a next second seed value.

13. The method of claim 12, wherein transmission and receipt of the start frame begin a secure communication session, and the method further comprises:
    terminating the secure communication session;
    using the next first seed value as the first seed value at the first node for a next secure communication session; and
    using the next second seed value as the second seed value at the second node for the next secure communication session.

14. The method of claim 1, further comprising:
    initializing, using a server, the first seed value at the first node; and
    initializing, using a server, the second seed value at the second node.

15. A system with secure communication, the system comprising:
  a first node storing first seed value and configured to
    generate a parameter data set containing a plurality of values;
    select, using the first seed value, one or more of the plurality of values in the parameter data set to form a first parameter subset;
    generate, using the first parameter subset, a first cipher key;
    encrypt user data using a first ciphersuite and the first cipher key;
    generate a first signature based at least on the parameter data set;
    transmit a start frame including the parameter data set, the encrypted user data, and the first signature at a first signature location in the start frame; and
  a second node storing second seed value and configured to
    receive the start frame;
    select, using the second seed value, one or more of the plurality of values in the parameter data set in the received start frame to form a second parameter subset;
    generate, using the second parameter subset, a second cipher key;
    decrypt the user data using a second ciphersuite and the second cipher key; and
    verify the first signature at the first signature location in the received start frame,
  wherein the first node is further configured to
    encrypt further user data using the first ciphersuite and the first cipher key,
    generate a second signature based at least on the further user data, and
    transmit a data frame including the encrypted further user data and the second signature at a second signature location in the data frame, and
  wherein the second node is further configured to
    receive the data frame,
    decrypt the further user data using the second ciphersuite and the second cipher key, and
    verify the second signature at the second signature location in the received data frame.

16. The system of claim 15, wherein the parameter data set includes random values.

17. The system of claim 15, wherein the second node is further configured to:
  detect a failure to verify the signature at the second signature location in the received data frame; and
  initiate resynchronizing, in response to detecting the failure, the first seed value and the second seed value.

18. The system of claim 15, further comprising a server configured to:
  initialize the first seed value at the first node; and
  initialize the second seed value at the second node.

* * * * *